Figure 1:
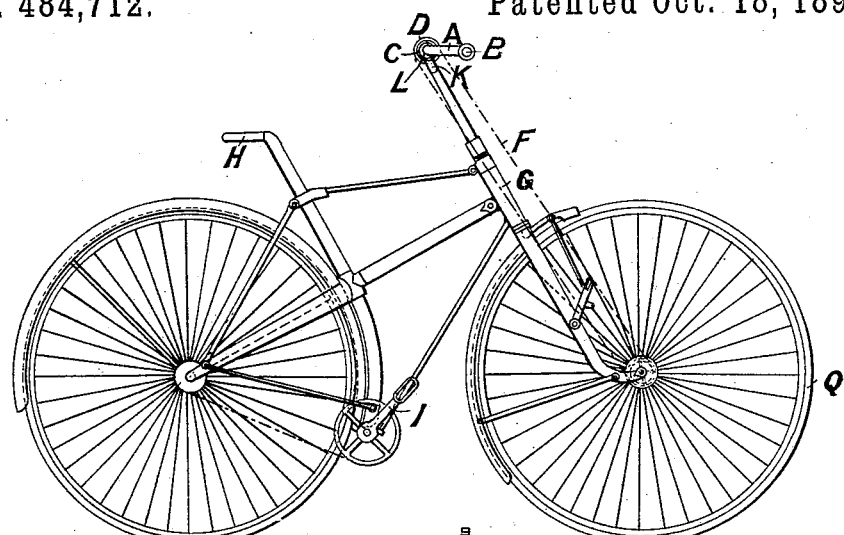

(No Model.) 2 Sheets—Sheet 1.

R. K. HARTLEY.
BICYCLE.

No. 484,712. Patented Oct. 18, 1892.

Witnesses:—
J. A. Rutherford.
Robert Everett.

Inventor:
Richard K. Hartley
By James L. Norris.
Attorney.

(No Model.) 2 Sheets—Sheet 2.
R. K. HARTLEY.
BICYCLE.
No. 484,712. Patented Oct. 18, 1892.
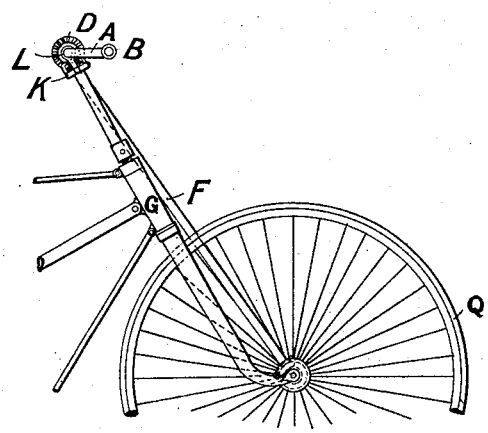
FIG. 4
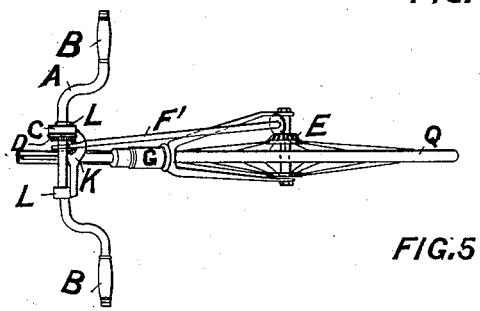
FIG. 5
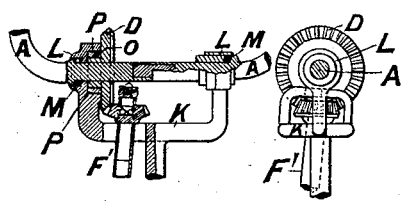
FIG. 6   FIG. 7
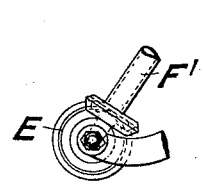
FIG. 8
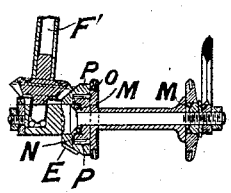
FIG. 9
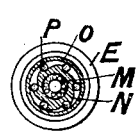
FIG. 10
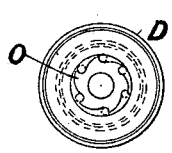
FIG. 10ᵃ
Witnesses:
J. A. Rutherford.
Robert Everett.
Inventor:
Richard K. Hartley.
By James L. Norris
Attorney.

UNITED STATES PATENT OFFICE.

RICHARD KENT HARTLEY, OF CHADDERTON, ENGLAND.

BICYCLE.

SPECIFICATION forming part of Letters Patent No. 484,712, dated October 18, 1892.

Application filed August 31, 1891. Serial No. 404,280. (No model.) Patented in England September 6, 1889, No. 14,045.

*To all whom it may concern:*

Be it known that I, RICHARD KENT HARTLEY, a citizen of Great Britain, residing at Chadderton, in the county of Lancaster, England, have invented new and useful Improvements in and Relating to Bicycles and Tricycles, (for which I have obtained a patent in Great Britain, No. 14,045, dated September 6, 1889,) of which the following is a specification.

This invention relates to bicycles and tricycles; and it has for its object to enable the hands, as well as the feet, to be employed in the propulsion of the vehicle.

In carrying out these improvements the steering-handles are fixed upon the opposite ends of a curved or cranked bar carried in ball or other suitable bearings in the head of the machine. This bar is so constructed and arranged that it may be used for steering in the ordinary manner, and so, also, that the cranked or curved steering-bar to which the handles are attached may be rotated by the hands. On the steering-bar there are arranged (by preference between the bearings) a friction, dog-tooth, or other suitable clutch or equivalent slip gear, and a chain-wheel, toothed pinion, or driving-pulley. The chain-wheel, pinion, or pulley is arranged to be put out of gear with the clutch or slip-gear or with the steering-bar by any known and suitable means. A chain-wheel toothed pinion or pulley is also mounted so as to rotate coaxially with the leading-wheel of the machine, and this wheel or pulley is geared with the wheel or pulley on the steering-bar by means of a pitch-chain, a band, cord, or a shaft and intermediate gearing, as the case may be. The ordinary or any suitable pedal-driving devices may be retained or employed for driving the machine in the usual manner, the hand-driving devices being employed as an addition to the pedal-driving and not as a substitute therefor, except in the case of an accident to the pedal-driving mechanism. It will be obvious that with this arrangement the rotation of the steering-bar will materially aid the propulsion of the vehicle, and that in the event of the foot-driven wheel or wheels overrunning or lagging the clutch or slip gear will still enable the hands to keep time (if desired) with the feet. The clutch or slip gear is operated by the rider to put the hand-driving mechanism into and out of action, as may be desired.

I will proceed to more particularly describe my said invention with reference to the accompanying drawings, in which—

Figure 2:
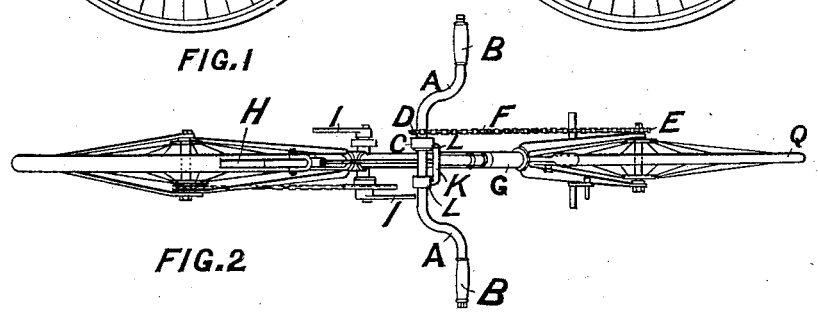
Figure 3:
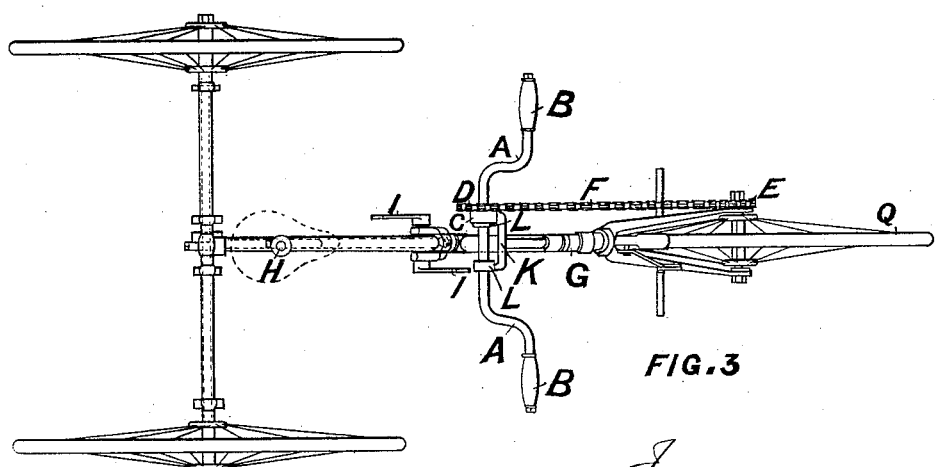

Figure 1 represents a bicycle in elevation; Fig. 2, the same machine in plan; Fig. 3, a tricycle in plan; Fig. 4, a modification of the hand-driving mechanism in elevation; Fig. 5, a plan of Fig. 4; Fig. 6, a longitudinal sectional view of the hand-driving mechanism illustrated by Figs. 4 and 5; Fig. 7, an end view of Fig. 6; Fig. 8, an elevation of the axle-gearing of the arrangement shown in Figs. 4 and 5; Fig. 9, a longitudinal section of the axle-gearing; Fig. 10, a transverse section of the clutch or slip gear on the axle of the leading-wheel, and Fig. $10^a$ a similar section and an elevation of the clutch or slip gear of the steering-bar.

In each of the figures in which the parts are represented similar parts are indicated by similar letters of reference.

A is the cranked or curved steering-bar. B B are the handles thereon.

C is the clutch or slip gear on the steering-bar.

D is the chain-wheel, toothed wheel, or pulley, as the case may be, keyed or secured upon the steering-bar.

E is the corresponding wheel or pulley on the axle of the leading-wheel.

F is the chain, and F' is the shaft by means of which the angular motion of the steering-bar is transmitted to the axle of the leading-wheel.

G is the neck of the machine.

H is the saddle-bar.

I I are the cranks, to which the pedals are attached.

K is the head.

L L are the bearings on the head for the steering-bar.

M M are ball-bearings.

N is the clutch or slip gear mounted on the axle of the leading-wheel.

O is the ring of the slip-gear.

P P are the balls or rollers of the same gear, and Q is the leading-wheel.

In the arrangements illustrated by Figs. 1, 2, and 3 the rotary motion given to the steering-bar by the hands is transmitted to the leading-wheel Q by means of the chain F and the chain-wheels D and E. Instead, however, of employing the chain-wheels and a chain, two equivalent pulleys and a band or cord may be employed, and in either case the slack which may rise from the stretching of the chain, band, or cord in use may be taken up by suitable jockey-pulleys or by a telescopic or adjustable neck G.

When a chain, band, or cord is objectionable because of its weight or because of its liability to come into contact with the dress of the rider, or for any other reason, I employ the toothed gearing and shaft illustrated by Figs. 4, 5, 6, 7, 8, and 9. This arrangement consists of the two pairs of bevel-wheels D E, of which the driving-wheel is secured on the steering-bar A, with its hub constructed to form the internal part of the clutch or slip gear. The driven wheel is mounted free upon the axle of the leading-wheel Q, with its rim constructed to form the ring O of the clutch or slip gear, while the hub of the wheel Q is prolonged to form the inner part of the clutch. The intermediate wheels, through which the motion is transmitted from the driver to the driven, are secured upon the shaft F' in gear with their respective wheels. This shaft is preferably formed of steel tube. The diameters of the driving and driven wheels will in case be determined by the desired relative numbers of the revolutions of the steering-bar and of the wheel Q in unit time.

I may employ any known and suitable clutch or slip gear for the purpose of connecting and disconnecting the hand mechanism; but I prefer to employ the construction illustrated by Figs. 6, 7, 8, 9, 10, and 10ª. In this modification of the apparatus, which resembles the substitute for the pawl and ratchet sometimes used in ratchet-drills, there are a series of concentric inclined planes, each of which terminates in a hollow recess, as shown in Figs. 10 and 10ª. In the apparatus C on the steering-bar these inclined planes are arranged around the hub of the driving wheel or pulley, in that on the axle of the wheel Q the inclined planes are arranged around the projecting hub of that wheel. Concentric with the hub on which the inclined planes are formed, there is a ring O, which in the case of the steering-bar is formed within the contiguous bearing, and in that of the wheel Q within the rim of the driven wheel or pulley. The inclined planes of the two apparatus are respectively arranged in opposite directions, as shown in Figs. 10 and 10ª. Between the inclined planes and the ring O there are placed the balls or rollers P P, one to each inclined plane.

When the steering-rod is rotated by hand in the driving direction, the balls or rollers P P are rolled down into the recesses at the lower ends of the inclined planes, and the driving wheel or pulley D, which is keyed upon the steering-bar, is also rotated. Upon the angular motion of the steering-bar being reversed through a small angle the balls or rollers P P run up the inclined planes and the steering-bar becomes locked, so far as angular motion is concerned, until it is again moved forward in the driving direction.

Although the motion of the gearing D E F is arrested, the wheel Q is free to rotate because of the clutch or slip gear N upon its axle. In this apparatus, when the gearing D E F is at rest the balls or rollers P P are in the lower parts of the inclined planes and the hub of the wheel Q can rotate freely in the clutch or slip gear without affecting the gearing; but so soon as the angular velocity of the driven wheel (driven by the rotation of the steering-bar) exceeds that of the wheel Q the balls or rollers in N are rolled up the inclined planes, and the driven wheel or pulley is thereby locked to the hub of the wheel Q so long as the angular velocities are equal. A similar clutch or slip gear may be applied to the hind wheel or hind wheels of the machine, and thus enable the pedals to be at rest when the machine is traveling downhill or otherwise at the will of the rider.

The steering-bar is used for its ordinary purpose precisely as in other machines of a similar type, in addition to its use in aiding the propulsion of the machine by the hands.

Having now particularly described and ascertained the nature of my said invention and in what manner the same is to be performed, I declare that what I claim is—

1. In a bicycle, tricycle, or similar machine, the combination, with pedal-driving mechanism, of an auxiliary driving mechanism and a combined steering and auxiliary driving mechanism operating cranked bar, the cranks of which are in line with each other, substantially as described.

2. In a bicycle, tricycle, or similar machine, the combination, with pedal-driving mechanism, of an auxiliary driving mechanism consisting of a wheel or pulley connected therewith, a cranked bar having a wheel or pulley thereon, each of said wheels or pulleys provided with a clutch-gear, and a connection gearing said wheels or pulleys together, the cranks of the cranked bar being in line with each other, whereby said bar serves the functions of a steering-bar and a bar for operating the auxiliary-driving mechanism, substantially as described.

In testimony whereof I have hereunto set my hand and affixed my seal in presence of two subscribing witnesses.

RICHARD KENT HARTLEY. [L. S.]

Witnesses:
    DUGALD CLERK,
    ARTHUR C. HALL.